United States Patent
Ferguson et al.

(10) Patent No.: US 6,336,094 B1
(45) Date of Patent: *Jan. 1, 2002

(54) METHOD FOR ELECTRONICALLY RECOGNIZING AND PARSING INFORMATION CONTAINED IN A FINANCIAL STATEMENT

(75) Inventors: Don Carl Ferguson, San Francisco; William Kornfeld, Redwood City, both of CA (US)

(73) Assignee: Price Waterhouse World Firm Services BV. Inc., Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/497,355

(22) Filed: Jun. 30, 1995

(51) Int. Cl.$^7$ .............................................. G06F 17/00

(52) U.S. Cl. ......................................................... 705/1

(58) Field of Search ..................... 364/408; 395/200.18, 395/885, 401, 410, 411, 412; 705/1, 35, 36, 30–34; 704/1, 9; 707/500, 513, 3, 5, 102, 503, 531, 904, 906, 908; 382/229

(56) References Cited

U.S. PATENT DOCUMENTS

| | | | | |
|---|---|---|---|---|
| 4,358,824 A | * | 11/1982 | Glickman et al. | ..... 364/419.19 |
| 4,417,321 A | * | 11/1983 | Chang et al. | ................ 395/600 |
| 4,754,428 A | * | 6/1988 | Schultz et al. | ......... 395/200.18 |
| 4,773,009 A | * | 9/1988 | Kucera et al. | ........... 364/419.1 |
| 4,813,010 A | * | 3/1989 | Okamoto et al. | ........... 364/900 |

(List continued on next page.)

FOREIGN PATENT DOCUMENTS

| | | | |
|---|---|---|---|
| EP | 0446634 | 9/1991 | ........... G06F/15/30 |
| EP | 0504743 | 9/1992 | ........... G06F/15/21 |
| JP | 4073354590 A | * 12/1995 | |

OTHER PUBLICATIONS

Price Waterhouse World Firm services Inc. (PRICN), Ferguson et al, Jul. 2000.*

McGraw–Hill Publications, Filing Rules and Procedures for EDGAR–izing Documents, Westenberg D.A, Oct. 1993.*

Aho et al., "The Theory of Parsing, Translation, and Computing; vol. 1: Parsing", Prentice–Hall, pp.178–184, 268–271, 301–307, 485–500, 1972.*

(List continued on next page.)

*Primary Examiner*—James P. Trammell
*Assistant Examiner*—Pierre E. Elisca
(74) *Attorney, Agent, or Firm*—John M. Johnson; Gregory Silberman; Kaye Scholer LLP

(57) ABSTRACT

A method for processing a file containing a financial statement in uncoded format such as a financial statement stored in an ASCII file. The starting locations of the various types of financial tables in the financial statement as indicated by their table titles are identified by grammar descriptors. When all the table titles in the file are identified, a table title is then selected for processing. Typically after the table title, there are the associated column headers for the table, and they are analyzed and determined. Following the column headers, there are lines of text that are separated into line items, where each line item is composed of a label and/or one or more numbers corresponding to the label. With these line items, the next task is to parse these line items to verify that these line items make up the table and to identify the components of the financial table. A financial table is comprised of line items, subtotals, and grand totals. By recognizing the mathematical structure of the table, the relationship between the line items, subtotals, and grand totals can be readily understood and categorized.

14 Claims, 13 Drawing Sheets

U.S. PATENT DOCUMENTS

| | | | | |
|---|---|---|---|---|
| 4,907,285 A | * | 3/1990 | Nakano et al. ............... | 382/48 |
| 4,965,763 A | * | 10/1990 | Zamora .................. | 364/419.19 |
| 4,972,349 A | * | 11/1990 | Kleinberger ................ | 364/900 |
| 5,164,899 A | * | 11/1992 | Sobotka et al. ............. | 364/419 |
| 5,307,266 A | * | 4/1994 | Hayashi et al. ........ | 364/419.07 |
| 5,375,207 A | * | 12/1994 | Blakely et al. ........ | 395/200.18 |
| 5,408,607 A | * | 4/1995 | Nishikawa et al. .... | 395/200.18 |
| 5,421,001 A | * | 5/1995 | Methe ........................ | 395/500 |
| 5,436,983 A | * | 7/1995 | Bernzott et al. ............ | 382/229 |
| 5,485,566 A | * | 1/1996 | Rahgozar .................... | 395/148 |
| 5,513,323 A | * | 4/1996 | Williams et al. ........ | 395/200.18 |
| 5,539,904 A | * | 7/1996 | Brauns et al. .............. | 395/600 |
| 5,813,009 A | * | 9/1998 | Johnson et al. ............. | 707/100 |

OTHER PUBLICATIONS

"Edgar: By mid–1996, All Registered 1934 and 1940 Act Companies Must Transmit SEC Filings Electronically", S&P's Review of Securities & Commodities Regulation, vol. 26, No. 17, p. 173, Oct. 1993.*

"Utility Eliminates Need for Manual Parsing Routine", Corporate Cashflow, vol. 14, No. 2, p. 41, Feb. 1993.*

"Major Components of a Complete Text Reading System", Proceedings of the IEEE, vol. 80, No. 7, p. 1133–1149, Jul. 1992.*

L. Owen Hill and David A. Zein, "Extracting Statistical Data from Free–Form Text" IEEE Circuits and Devices Magazine, pp. 18–24, 1986.*

Yuan Y. Tang, Ching Y. Suen, Change De Yan and Mohamed Cheriet, "Financial Document Processing Based on Staff Line and Description Language," IEEE Transcations on Systems, Man, and Cybernetics, vol. 25, No. 5, May 1995.*

Document Technologies, Inc. "Edgar Ease Reference Manual 1.3" May 1993 1995.*

"SGML tools: Microsoft into the act." Seybold Report on Publishing Systems, v24, n4, pS32 (6), Oct. 1994.*

Walter, Mark; Alexander, George A., "Status Report on SGML: notes from SGML '93" Seybold Report on Publishing Systems, v23, n9, p3(11), Jan. 1994.*

"Tools and Utilities (software packages that help database developers prototype and design applications, query, and create help systems, among other uses)" 1993 Database Buyer's Guide Special Issue)DBMS, v6,n7, p63, Jun. 1993.*

Flanders, Bruce, "Hypertext multimedia software: Bell Atlantic DocuSource." Computers in Libraries, v13, n1, p35(4), Jan. 1993.*

1–Hill, L.O. et al., Extracting Statistical Data from Free––From Text, May 1986, vol. 2, No. 3, IEEE Circuits and Devices Magazine, pp. 18–24.

2–Tang, Yuan y et al., Financial Document Processing Based on Staff Line and Description Language, May 1995, vol. 25, No. 5, IEEE Transactions on Systems, Man and Cybernetics, pp. 738–753.

3–(2) European Search Reports.

* cited by examiner

```
1   Consolidated Balance Sheet
2   <TABLE>
3   <CAPTION>
4   In millions, except share data
5   December 31                                                      1993              1992
6   <S>                                                              <C>               <C>
7   Assets
8   Current assets
9   Cash, including cash equivalents of $160.0 and $95.9        $   231.8         $   147.4
10  Accounts receivable (less allowance for doubtful
11      accounts of $23.1 and $23.5)                                 329.3             316.3
12  Inventories                                                      374.9             332.2
13  Prepaid expenses and other                                       145.8             107.4
14  ------------------------------------------------------------------------------------------
15  Total current assets                                           1,081.8             903.3
16  ------------------------------------------------------------------------------------------
17  Property, plant and equipment, at cost
18  Land                                                              41.7              39.4
19  Buildings and improvements                                       499.3             478.9
20  Equipment                                                        529.5             530.6
21  ------------------------------------------------------------------------------------------
22                                                                 1,070.5           1,048.9
23  Less accumulated depreciation                                    590.0             566.6
24  ------------------------------------------------------------------------------------------
25  net property                                                     480.5             482.3
26  ------------------------------------------------------------------------------------------
27  Intangible assets (less accumulated amortization of
28      $27.9 and $23.6)                                             145.3             144.8
29  Other assets                                                     250.4             205.3
30  ------------------------------------------------------------------------------------------
31  Total assets                                                 $1,958.0          $1,735.7
32  ------------------------------------------------------------------------------------------
```

FIG. 1a-1

|  | | | |
|---|---:|---:|---:|
| 33 | Liabilities and Shareholders' Equity | | |
| 34 | Current liabilities | | |
| 35 | Debt maturing within one year | $ 70.4 | $ 37.3 |
| 36 | Accounts payable | 378.0 | 365.2 |
| 37 | Accrued compensation | 59.5 | 62.0 |
| 38 | Other accrued liabilities | 225.7 | 247.7 |
| 39 | Sales and other taxes | 95.8 | 94.0 |
| 40 | Income taxes | 229.3 | 196.6 |
| 41 | | | |
| 42 | Total current liabilities | 1,058.7 | 1,002.8 |
| 43 | | | |
| 44 | Long-term debt | 123.7 | 177.7 |
| 45 | Employee benefit plans | 295.1 | 100.7 |
| 46 | Deferred income taxes | 30.5 | 23.0 |
| 47 | Other liabilities (including minority interest of $43.2 and | | |
| 48 | $36.9) | 136.0 | 121.0 |
| 49 | Commitments and contingencies | | |
| 50 | Shareholders' equity | | |
| 51 | Common stock, par value $.50 - authorized: 200,000,000 shares; | | |
| 52 | issued - 86,528,692 and 86,445,682 shares | 43.3 | 43.2 |
| 53 | Additional paid-in capital | 652.3 | 654.3 |
| 54 | Retained earnings | 150.6 | 126.5 |
| 55 | Translation adjustments | (175.3) | (155.6) |
| 56 | Treasury stock, at cost - 14,430,073 and 14,479,431 shares | (356.9) | (357.9) |
| 57 | | | |
| 58 | Total shareholders' equity | 314.0 | 310.5 |
| 59 | | | |
| 60 | Total liabilities and shareholders+ equity | $1,958.0 | $1,735.7 |
| 61 | | | |
| 62 | <FN> | | |
| 63 | The accompanying notes are an integral part of this statement. | | |
| 64 | | | |

FIG. 1a-2

| | | |
|---|---|---|
| 1 | CUMULATIVE EFFECT OF ACCOUNTING CHANGES | |
| 2 | Postretirement benefits other than pensions (net of | |
| 3 | income tax benefit of $18,115)............................ | -- (32,690) |
| 4 | Income taxes................................................. | -- 12,844 |
| 5 | | |
| 6 | NET EARNINGS............................................. | $387,526 $349,046 $312,558 |
| 7 | | |

FIG. 1b

ADOLPH COORS COMPANY AND SUBSIDIARIES
CONSOLIDATED BALANCE SHEET

| | | December 25, 1994 | December 26, 1993 |
|---|---|---|---|
| 1 | | | |
| 2 | | (In thousands) | |
| 3 | | | |
| 4 | | | |
| 5 | | | |
| 6 | | | |
| 7 | Assets | | |
| 8 | <S> | <C> | <C> |
| 9 | Current assets: | | |
| 10 | Cash and cash equivalents | $ 27,168 | $ 82,211 |
| 11 | Accounts and notes receivable, | | |

FIG. 1c

| | | | | |
|---|---|---|---|---|
| 1 | common stock | $ 1.52 | $ (1.10) | $ (0.05) |
| 2 | | ======= | ====== | ====== |
| 3 | </TABLE> | | | |
| 4 | See accompanying notes to consolidated financial statements. | | | |
| 5 | <PAGE> | | | |
| 6 | <TABLE> | | | |
| 7 | <CAPTION> | | | |
| 8 | ADOLPH COORS COMPANY AND SUBSIDIARIES | | | |
| 9 | CONSOLIDATED BALANCE SHEET | | | |
| 10 | | | | |
| 11 | | | | |
| 12 | | | | |
| 13 | | | | |
| 14 | | | December 25, | December 26, |
| 15 | | | 1994 | 1993 |
| 16 | | | ---------- | ---------- |
| 17 | | | (In thousands) | |
| 18 | Assets | | | |
| 19 | <S> | | <C> | <C> |
| 20 | Current assets: | | | |
| 21 | Cash and cash equivalents | | $ 27,168 | $ 82,211 |

FIG. 1d

Reverse the list
    Pass over the list:
        Select a line item from the list and use its value as a subtotal
            * summing the values of the line items following the selected line one line at a time;
            * if the sum equals the subtotal, the line items following the selected line is marked as a block and treated as a line item;
            * include line items with 0 values in the block
            * include header lines if they are present in the block
        Repeat with the next line item as the subtotal until the list is empty
    If subtotals were found, pass over the list again
Reverse the list

FIG. 3

```
 1    BALANCE SHEET: INITIAL STATE
 2
 3    Assets                                              []
 4
 5    Current assets                                      []
 6    Cash, including cash equivalents of $160          + [231800,147400]
 7    Accounts receivable (less allowance for           + [329300,316300]
 8    Inventories                                       + [374900,332200]
 9    Prepaid expenses and other                        + [145800,107400]
10                                                        ---------
11      Total current assets                              [1081800,903300]
12
13
14    Property, plant and equipment, at cost              []
15    Land                                                [41700,39400]
16    Buildings and improvements                          [499300,478900]
17    Equipment                                           [529500,530600]
18                                                        ---------
19                                                        [1070500,1048900
20
21    Less accumulated depreciation                     - [590000,566600]
22                                                        ---------
23    net property                                        [480500,482300]
24
25    Intangible assets (less accumulated amor            [145300,144800]
26    Other assets                                        [250400,205300]
27                                                        ---------
28      Total assets                                      [1958000,1735700]
29
30
31    Liabilities and Shareholders' Equity                []
32
33    Current liabilities                                 []
34    Debt maturing within one year                     + [70400,37300]
35    Accounts payable                                  + [378000,365200]
36    Accrued compensation                              + [59500,62000]
37    Other accrued liabilities                         + [225700,247700]
38    Sales and other taxes                             + [95800,94000]
39    Income taxes                                      + [229300,196600]
40                                                        ---------
41      Total current liabilities                         [1058700,1002800]
42
43    Long-term debt                                      [123700,177700]
44    Employee benefit plans                              [295100,100700]
45    Deferred income taxes                               [30500,23000]
46    Other liabilities (including minority in            [136000,121000]
47    Commitments and contingencies                       []
48
49    Shareholders' equity                                []
50    Common stock, par value $.50 - authorize          + [43300,43200]
51    Additional paid-in capital                        + [652300,654300
52    Retained earnings                                 + [150600,126500
53    Translation adjustments                           + [-175300,-1556 0]
54    Treasury stock, at cost - 14,430,073 and          + [-356900,-3579 0]
55                                                        ---------
56      Total shareholders' equity                        [314000,310500]
57
58
59      Total liabilities and shareholders+ equ           [1958000,1735700]
60
```

FIG. 5

```
 1    BALANCE SHEET: AFTER FIRST PASS
 2
 3    Assets                                              []                  80
 4
 5    Current assets                                      []
 6    Cash, including cash equivalents of $160         +  [231800,147400]
 7    Accounts receivable (less allowance for          +  [329300,316300]
 8    Inventories                                      +  [374900,332200]
 9    Prepaid expenses and other                       +  [145800,107400]
10
11     Total current assets                                [1081800,903300]
12
13
14    Property, plant and equipment, at cost              []
15    Land                                                [41700,39400]
16    Buildings and improvements                          [499300,478900]    82
17    Equipment                                           [529500,530600]
18
19                                                        [1070500,1048900]
20
21    Less accumulated depreciation                    -  [590000,566600]
22
23    net property                                        [480500,482300]
24
25    Intangible assets (less accumulated amor            [145300,144800]
26    Other assets                                        [250400,205300]
27
28     Total assets                                       [1958000,1735700]
29
30
31    Liabilities and Shareholders' Equity                []                  84
32
33    Current liabilities                                 []
34    Debt maturing within one year                    +  [70400,37300]
35    Accounts payable                                 +  [378000,365200]
36    Accrued compensation                             +  [59500,62000]
37    Other accrued liabilities                        +  [225700,247700]
38    Sales and other taxes                            +  [95800,94000]
39    Income taxes                                     +  [229300,196600]
40
41     Total current liabilities                           [1058700,1002800]
42
43    Long-term debt                                      [123700,177700]
44    Employee benefit plans                              [295100,100700]
45    Deferred income taxes                               [30500,23000]
46    Other liabilities (including minority in            [136000,121000]    86
47    Commitments and contingencies                       []
48
49    Shareholders' equity                                []
50    Common stock, par value $.50 - authorize         +  [43300,43200]
51    Additional paid-in capital                       +  [652300,654300]
52    Retained earnings                                +  [150600,126500]
53    Translation adjustments                          +  [-175300,-1556 0]
54    Treasury stock, at cost - 14,430,073 and         +  [-356900,-3579 0]
55
56     Total shareholders' equity                         [314000,310500]
57
58
59    Total liabilities and shareholders+ equ             [1958000,1735700]
60
```

FIG. 6

```
 1   BALANCE SHEET: AFTER SECOND PASS
 2                                                                                    80
 3    Assets                                         []
 4
 5    Current assets                                              []
 6    Cash, including cash equivalents of $160             +  [231800,147400]
 7    Accounts receivable (less allowance for              +  [329300,316300]
 8    Inventories                                          +  [374900,332200]
 9    Prepaid expenses and other                           +  [145800,107400]
10                                                          ---------
11     Total current assets                            [1081800,903300]
12
13
14    Property, plant and equipment, at cost                      []
15    Land                                                 +  [41700,39400]
16    Buildings and improvements                           +  [499300,478900]
17    Equipment                                            +  [529500,530600]
18                                                          ---------
19                                                    [1070500,1048900]
20
21    Less accumulated depreciation                   -  [590000,566600]
22                                                          ---------
23    net property                                    [480500,482300]
24
25    Intangible assets (less accumulated amor        [145300,144800]        88
26    Other assets                                    [250400,205300]
27
28     Total assets                                   [1958000,1735700]     90
29
30
31    Liabilities and Shareholders' Equity            []
32
33    Current liabilities                                         []
34    Debt maturing within one year                        +  [70400,37300]
35    Accounts payable                                     +  [378000,365200]
36    Accrued compensation                                 +  [59500,62000]
37    Other accrued liabilities                            +  [225700,247700]
38    Sales and other taxes                                +  [95800,94000]
39    Income taxes                                         +  [223300,196600]
40                                                          ---------
41     Total current liabilities                       [1058700,1002800]
42
43    Long-term debt                                  [123700,177700]
44    Employee benefit plans                          [295100,100700]
45    Deferred income taxes                           [30500,23000]
46    Other liabilities (including minority in        [136000,121000]
47    Commitments and contingencies                   []
48
49    Shareholders' equity                                        []
50    Common stock, par value $.50 - authorize             +  [43300,43200]
51    Additional paid-in capital                           +  [652300,654300]
52    Retained earnings                                    +  [150600,126500]
53    Translation adjustments                              +  [-175300,-155600]
54    Treasury stock, at cost - 14,430,073 and             +  [-356900,-357900]
55                                                          ---------
56     Total shareholders' equity                      [314000,310500]
57
58
59     Total liabilities and shareholders+ equ        [1958000,1735700]
60
```

FIG. 7

```
 1    BALANCE SHEET: AFTER THIRD PASS                                          ,92
 2                                                                    ┌─────────────────────────┐
 3    Assets                                                          │ []                      │
 4                                                                    │                         │
 5    Current assets                                                  │    []                   │
 6    Cash, including cash equivalents of $160                        │  + [231800,147400]      │
 7    Accounts receivable (less allowance for                         │  + [329300,316300]      │
 8    Inventories                                                     │  + [374900,332200]      │
 9    Prepaid expenses and other                                      │  + [145800,107400]      │
10                                                                    │    --------             │
11       Total current assets                                         │    [1081800,903300]     │
12                                                                    │                         │
13    Property, plant and equipment, at cost                          │    []                   │
14    Land                                                            │  + [41700,39400]        │
15    Buildings and improvements                                      │  + [499300,478900]      │
16    Equipment                                                       │  + [529500,530600]      │
17                                                                    │    --------             │
18                                                                    │    [1070500,1048900]    │
19                                                                    │                         │
20    Less accumulated depreciation                                   │  - [590000,566600]      │
21                                                                    │    --------             │
22    net property                                                    │    [48050 0,482300]     │
23                                                                    │                         │
24    Intangible assets (less accumulated amor                        │    [145300,144800]      │
25    Other assets                                                    │    [25040 0,205300]     │
26                                                                    │                         │
27       Total assets                                                 │    [1958000,1735700]    │
28                                                                    └─────────────────────────┘
29                                                                                            ,94
30                                                                    ┌─────────────────────────┐
31    Liabilities and Shareholders' Equity                            │    []                   │
32                                                                    │                         │
33    Current liabilities                                             │    []                   │
34    Debt maturing within one year                                   │  + [70400,37300]        │
35    Accounts payable                                                │  + [378000,365200]      │
36    Accrued compensation                                            │  + [59500,62000]        │
37    Other accrued liabilities                                       │  + [225700,247700]      │
38    Sales and other taxes                                           │  + [95800,94000]        │
39    Income taxes                                                    │  + [229300,196600]      │
40                                                                    │    --------             │
41       Total current liabilities                                    │  + [1058700,1002800]    │
42                                                                    │                         │
43    Long-term debt                                                  │  + [123700,177700]      │
44    Employee benefit plans                                          │  + [295100,100700]      │
45    Deferred income taxes                                           │  + [30500,23000]        │
46    Other liabilities (including minority in                        │  + [136000,121000]      │
47    Commitments and contingencies                                   │  + []                   │
48                                                                    │                         │
49    Shareholders' equity                                            │    []                   │
50    Common stock, par value $.50 - authorize                        │  + [43300,43200]        │
51    Additional paid-in capital                                      │  + [652300,654300]      │
52    Retained earnings                                               │  + [150600,126500]      │
53    Translation adjustments                                         │  + [-175300,-155600]    │
54    Treasury stock, at cost - 14,430,073 and                        │  + [-356900,-357900]    │
55                                                                    │    --------             │
56       Total shareholders' equity                                   │  + [314000,310500]      │
57                                                                    │                         │
58                                                                    │    --------             │
59       Total liabilities and shareholders+ equ                      │    [1958000,1735700]    │
60                                                                    └─────────────────────────┘
```

FIG. 8

METHOD FOR ELECTRONICALLY RECOGNIZING AND PARSING INFORMATION CONTAINED IN A FINANCIAL STATEMENT

CROSS REFERENCE TO APPENDIXES

Appendixes A, B, C, and D, which are part of the present disclosure, consists of three sheets attached herein and are listings of the software aspects of the preferred embodiment of the present invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention generally relates to methods for recognizing and parsing information in a data file, in particular, a method for identifying information such as financial tables in a financial statement contained in an uncoded text file, and parsing and decomposing the information into its constituent parts.

2. Description of the Prior Art

Financial statements of a number of U.S. public corporations are now available electronically from a number of sources and can be obtained via the internet. In the future, all corporations will be required under the law to file their financial statements electronically. A financial statement is required to contain certain tables of information such as balance sheets, income statements, and cash flow statements, and there may be information explaining the tables and other pertinent information regarding the company.

In the electronic format, a file containing the financial statement is typically uncoded, meaning that there are no codes in the file specifically indicating the type of information represented by each line or column of text. Although the file is typically in plain ASCII text and ASCII text is conducive for reading by a person, it is not conducive for processing by a computer. In order to have the computer extract the desired information from the file, the content of the file must be identified, meaning that the various tables in the file must be recognized and the content within each table must be parsed and be broken down to their constituent parts. Once the data is recognized and broken down, it can be normalized and manipulated. For example, the normalized data can be placed in a spreadsheet program or a database program and the performance of the company can be illustrated and analyzed by various mathematical, statistical, or financial models. The relationship between various financial statement entries can be compared and hypothetical situations can be generated and tested. Furthermore, industry analysis can be performed as well by gathering and collating data from the financial statements of several companies. Thus, there is great incentive for identifying and parsing the content of a file containing a financial statement.

There are two important considerations in the process of identifying and parsing of a file containing a financial statement. The first consideration is speed; the second consideration is accuracy.

Once the financial statement of a company is released, it will have immediate impact upon the valuation of the stock of the company. It may also, when combined with information relating to other companies, impact the valuation of the industry. Thus, it is time-critical to have the financial statement available in a form that can be manipulated for analysis. Furthermore, if a large number of financial statements must be processed, a method for processing of the statements must have reasonable computational speed. The financial statement must also be accurately recognized and processed. Inaccurate financial information can have a disastrous impact on the decision making process. It is therefore important that means be available for facilitating timely and accurate analysis of the statements.

A method currently employed by a database company for processing financial statements requires that the information be categorized and manually entered. This is a labor-intensive process that is slow and prone to human error. Hence, there is a need for a fast and accurate method for recognizing and parsing of files containing financial statements.

There are several problems associated with the processing of a file containing a financial statement. First of all, a file containing a financial statement would include tables such as balance sheets, income statements, and cash flow statements. These tables and their locations must be identified and the line items that compose these tables must be identified as well. Referring to FIG. 1a, a portion of an ASCII file containing a balance sheet is illustrated. Within each table, there may be several years of information set out in column form with column headers. The column headers and boundaries for each column need to be identified in order to identify the content of each column for each line item. Note that although the ASCII files may contain some codes indicated in angle brackets, these codes are not always present and are not sufficient as indicators for a program to properly parse the information in the files.

Another problem in the processing of the file is that each entry or line item in the table needs to be identified and recognized. Because the label of a line item in the table may be longer than one line of text, running over to two or more lines of text, the several lines of text need to be properly amalgamated to form the label.

After the entries for a table have been identified, the components of the table and the relationship among the components needs to identified. One approach to this problem is to parse the mathematical structure of the table. In the prior art, parsing typically starts from the top of the table and proceeds to the bottom of the table. This approach proves to be time-consuming and the results produced are unsatisfactory. If there is a mistaken assumption made at the beginning of the parsing process, the mistaken assumption may not be discovered until further down the table, wasting previous efforts. In addition, the number of permutations of parsing path possibilities for this approach is quite large.

After the components making up the table are verified by the parsing process, the components composing the table must be identified and categorized so that the computer can properly process the data.

SUMMARY OF THE INVENTION

It is therefore an objective of the present invention to provide an automated method for identifying financial statements stored in uncoded electronic format such as an ASCII file.

It is another objective of the present invention to provide an automated method for identifying financial tables such as balance sheets, income statements, and cash flow statements of a financial statement stored in uncoded format.

It is yet another objective of the present invention to provide an automated method for identifying the line items that compose a financial table.

It is still another objective of the present invention to provide an automated method for amalgamating several lines of text to form the label of a line item.

It is still another objective of the present invention to provide an automated method for parsing the mathematical structure of a financial table.

It is still another objective of the present invention to provide an automated method for recognizing the components of the tables.

Briefly, a preferred embodiment of the present invention provides a process for processing a file containing a financial statement in uncoded format such as a financial statement stored in an ASCII file. Referring to FIG. 2, the starting locations of the tables in the financial statement as indicated by their table titles are identified (block 10). When all the table titles are identified, a table title is then selected for processing (block 12). Typically after the table title, there are the associated column headers for the table, and they are analyzed and determined (block 14). After the column headers, there are lines of text that need to be differentiated into line items, where each line item is composed of a label and/or one or more numbers corresponding to the label (block 16). With these line items, the next task is to parse these line items to verify that these line items make up the table and to identify the components of the table (block 18). If the lines are successfully parsed, the components of the table can be identified and categorized (block 20).

The present invention is implemented using the programming language PROLOG. However, it is to be understood that the present invention is not limited the programming language utilized.

An advantage of the present invention is that it provides a method for identifying the constituent parts of financial statements presented in uncoded format such as an ASCII file.

Another advantage of the present invention is that it provides a method for identifying financial tables such as balance sheets, income statements, and cash flow statements of a financial statement stored in uncoded format.

Yet another advantage of the present invention is that it provides a method for identifying the line items that compose a financial table.

Still another advantage of the present invention is that it provides a method for amalgamating several lines of text to form the label of a line item.

Still another advantage of the present invention is that it provides a method for deriving the mathematical structure of a table.

Still another advantage of the present invention is that it provides a method for recognizing the components of the tables.

IN THE DRAWINGS

FIG. 1a is an example of a portion of an ASCII file containing a financial statement; specifically, a balance sheet is illustrated.

FIG. 1b is an example of a portion of a financial statement illustrating a label of a line item extending across several lines of text.

FIG. 1c illustrates a portion of a financial table having two columns and column headers.

FIG. 1d illustrates a portion of a financial statement where one financial table ends and another financial table starts.

FIG. 3 is a pseudo-code listing of the general operation of the parsing process of the present invention.

FIG. 5 shows the state of a balance sheet after the line items have been identified but before it is parsed.

FIG. 6 shows the subtotals found after a first pass by the parser of the present invention.

FIG. 7 shows the subtotals found after a second pass by the parser of the present invention.

FIG. 8 shows the subtotals found after a third pass by the parser of the present invention.

DETAILED DESCRIPTION OF THE PREFERRED EMBODIMENTS

Figure 2:
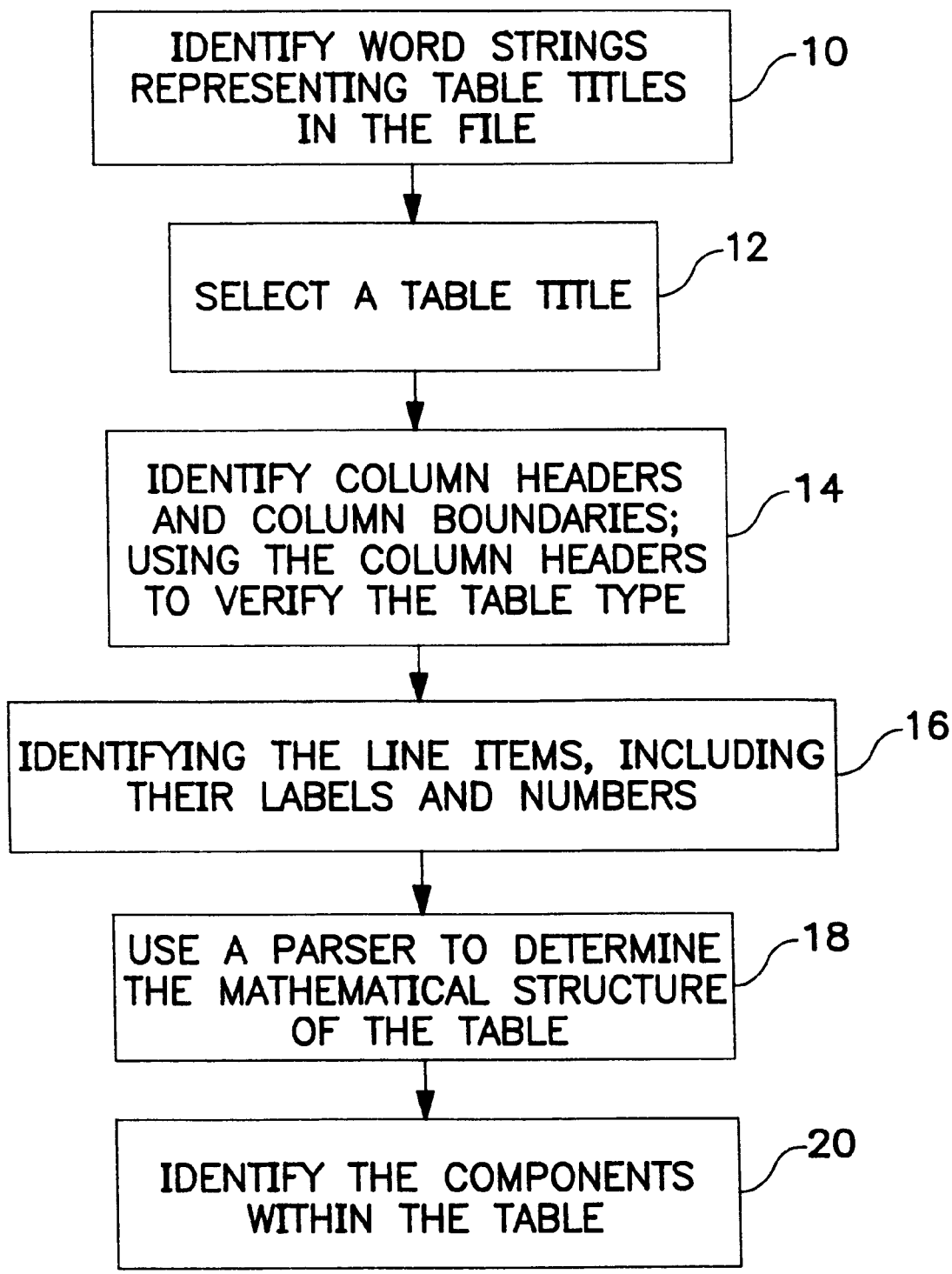
FIG. 2 is a generalized block diagram illustrating the steps in recognizing financial tables in a financial statement.

A preferred embodiment of the present invention provides a process for processing a file containing a financial statement in uncoded format such as a financial statement stored in an ASCII file. The file may be very long (often over 200 pages) and may contain numerous tables. First of all, the starting locations of the file tables, which are usually identified by table titles, must be located. However, a particular type of table may be labelled in a variety of manners. The present invention provides a table extraction system to identify the tables in the file. For each particular type of table, a grammar descriptor for identifying the different ways that a table title may be stated is provided. A grammar descriptor is a routine that provides means to identify all the possible words or combination of words that may make up a table title for a particular type of table. The entire file is first scanned to find all the word strings that may represent titles of a particular type of table. Each matching word string is weighed and given a value according to how closely it resembles a possible table title. Contributing factors include whether the word string is centered, whether it stands alone or appears to be part of a sentence, whether the words in the title are capitalized, and whether there appears to be a table in the vicinity following the title. Once all the strings are weighed and given a value, the strings are processed in the order of the weighed values.

Financial tables typically present 2–3 years worth of data. Thus, for each table, there may be several columns of information identified by the column headers. The header above each column of numbers specifies the type of information, typically the time period, for the column. After finding a table title, the column headers and their boundaries are identified. The column headers serve as a confirmation that the word string being processed is really a table title. If no column headers are found, the word string is most likely not a table title, and the next word string is processed. With the approximate column boundaries identified, the column boundaries serve as a useful starting point when extracting numbers from the lines of text. Finally, the column headers serve a functional purpose in identifying the type of data in each column. In identifying the column headers, a grammar descriptor for the particular table type is utilized.

After the columns and column headers have been identified, the present invention processes the line items composing the table. First, a line item with a very long label may "bleed" into the columns or may occupy several lines of text. The process of determining whether a line item is word-wrapped is called label amalgamation. A variety of heuristics are used to determine if two or more lines should be joined as one. Factors to consider include line indentation, the absence of numbers for the beginning lines, the presence of a connecting word, such as "of", at the end of the first line or at the beginning of the second line, and the case of the first word of the preceding line. After amalgamating the line items, each line item in the table is represented by a label and/or one or more numbers.

Detecting the end of a table requires special attention. A table may appear to have ended only to continue on the following page, a table may be immediately followed by another table, or a table may have ended and be followed by lines of text. In the case where there is a page break before the table ends, there may be column headers in the following page with new column boundaries. These column headers are recognized as such and excluded from the table. This is especially important in the case where the column headers are numbers indicating the year for each column of the data. In the case where the table ends and is followed by lines of text, these lines of text may be misinterpreted as a long label unless properly recognized as such.

After the line items have been processed and the end of the table determined, it is believed that this series of line items composes the table. To ensure that the line items do in fact represent the table in question and to identify the components of the table, the present invention provides a parser to identify the mathematical structure of the table.

A financial table is comprised of line items, subtotals, and grand totals. By recognizing the mathematical structure of the table, the relationship between the line items, subtotals, and grand totals can be readily understood and categorized. The components of the table can be recognized once the mathematical structure of the table is recognized since a component is typically a subtotal.

The present invention provides a bottom-up parser where the series of line items are processed from the bottom of the table to the top of the table. The last line of the table is first taken as a subtotal. In traversing up the table and maintaining a running total of the numbers from the line items preceding the subtotal line, two tests may be performed for each line item being processed. In the first test, the number from the current line item is summed with the running total. If the sum equals the subtotal, the constituent line items are marked as a block having the value of the subtotal. When computing subsequent, higher-order subtotals in subsequent passes, the blocked line items are treated as a single line item. If the sum does not equal to the subtotal, the second test is performed and determines whether or not the number in the current line subtracting the running total equals the subtotal. If the subtraction equals the subtotal, as discussed above, the constituent line items are marked as a block having the value of the subtotal, and the blocked line items are treated as a single line item for the subsequent passes.

If one or more subtotals are found, it is then necessary to make another bottom-up pass over the data to find higher-order subtotals. When there has been a pass over the data where no subtotals are found, the process stops.

However, if the parser fails to divide the table into its expected components, it may be the situation that a subtotal is not recognized because it is comprised of a sequence of additions and subtractions. The present invention provides a method that can compute "mixed" subtotals by non-deterministically negating selected line items and recomputing subtotals.

Note that the reference to a number from a line item may be a reference to a number vector as well where a given line item has more than one column. The numbers for the different columns for the same line item are processed in the same manner. The number vector allows cross-check between the columns and avoids the possibility that a sequence of line items will add up by coincidence, since the coincidence would have to co-occur in all the columns of the table.

Once the mathematical structure of the table has been determined, the components of the table can be easily recognized and categorized via a pattern matching process.

Referring to FIG. 2, as suggested by block 10, the first step in processing of a file containing a financial statement is to identify the tables in the file. An financial summary may be entitled "Selected Historical Summary", "Consolidated Ratios", or other variations. The present invention provides a grammar descriptor for each particular type of table in order to identify word strings that may be table titles. A sample grammar descriptor written in PROLOG for recognizing financial summary table titles is illustrated in Appendix B.

Each word string that resembles a particular table title is processed and given a weighed value based on a set of contributing factors which estimate the likelihood of the word string of being a table title. Contributing factors include whether the pattern is centered, whether it stands alone or appears to be part of a sentence, whether the words in the title are capitalized, and whether there appears to be a table in the vicinity following the title. After each word string is processed by the grammar descriptor and contributing factors are considered, a value is assigned to each word string. The word strings are then ranked accordingly. For example, a line of text containing a word string, "Consolidated Balance Sheet", found by the grammar descriptor is divided into a left portion, center portion, and a right portion. In a line of text, the left portion is the portion of the text line to the left of the word string, the center portion is the word string, and the right portion is the portion of the text line to the right of the word string. If the left portion is blank space, it is assigned a higher weight (a higher number) than if it contained words. However, heuristics can be provided such that if certain words occur in the left portion, the left portion is assigned a higher value than otherwise. For the center portion, the case and the position of the center portion are considered. If the word string is all uppercase, it is given a high value; if the word string is mixed case, it is given a lower value; and an even lower value is given to a word string of all lower case. If the center portion is approximately at the center of the text line, the center portion is assigned more points. For the right portion, similar to the left portion, a blank space is given a higher value than otherwise. Note that negative values may be assigned to the portions as well to discount certain factors. The values assigned to each portion are summed and this is the weighed value for the word string.

By this method, the word string with the highest value is considered to have the highest probability of being a table title and indicating the starting location of a table. If this word string later turns out not to be a table title, the word string with the next highest value is processed. Other types of tables are processed in a similar manner using grammar descriptors and contributing factors.

After a table is selected (block 12), the column headers following the table title are identified and processed as indicated by block 14. Financial tables such as balance sheets and income statements typically present 2–3 years of data. The headers above each column of numbers specify the type of information represented by the data such as the time period of the data. For each type of table, certain columns of information are expected and a grammar descriptor is provided to parse and recognize the column headers. FIG. 1c illustrates a financial table with two column headers. An example of a column grammar descriptor is as follows:

table_description(balance_sheet, '10-K', 25, 0, [no_header, year, year]).

column_description(year, year, {['$year'], ['$month', '$year'], ['$month', '$day', '$year']}).

The "table_description" stipulates that the column header for a "balance_sheet" in a "10-K" (a corporation's annual filing) may be no more than 25 lines from the table title. The column header will contain 3 columns. The first column will not have an explicit column header (hence "no_header"), and the next two columns will have column headers of "year". The column_description specifies what constitutes a "year". It accepts patterns such as "1994", "December 1994", and "Dec. 31, 1994". Special tokens ($year, $month, and $day) are used to match the date-related patterns.

Recognition of column headers serves as a confirmation that the word string is in fact a table title. If no column headers are found, the program logic will discard this particular word string and select the next string to process. If column headers are found, the headers will indicate the type of data in the associated columns of data. Additionally, the approximate column boundaries for each column can be determined in order to recognize the data within the line items.

Following the column headers, there are a number of line items composing the table that must be identified (block 16). Each line item includes a label and a set of numbers corresponding to the columns. The label states the type of information being represented by the numbers. A label may be very long and may bleed into the number columns or may occupy several lines of text. For example, referring to FIG. 1b, the line item beginning with the word "Postretirement" spans two lines. As indicated above, the process of determining which line items are word-wrapped is call label amalgamation. A variety of heuristics are used to determine if two lines should be joined as one. Contributing factors include line indentation, the absence of numbers on the first line, the presence of a connecting word, such as "of", at the end of the first line or at the beginning of the second line, and the case of the first word of the line. In the above example, the line beginning with the word "CUMULATIVE" would not be amalgamated with the line beginning with the word "Postretirement" because the first word is all capitalized and the second word only starts with a capitalized character, indicating that this is probably the start of a new line. Note that the line beginning with the word "income" is indented and is considered part of the line above. Also note that the line beginning with the word "Postretirement" ends with a connecting word such as "of" which indicates that there is a subsequent line to follow that should be amalgamated with the first line.

A table may cross page breaks and continue on the following page. The page breaks must be recognized as such and not as the end of the table. On the following page, there may be column headers with different column boundaries than the previous page. The present invention checks for this possibility when processing the beginning lines of a new page to look for new column headers and column boundaries.

Because a table may not have any particular marker to indicate the end of the table, there are special situations that require special processing. In one case, a table may be followed by a paragraph of text. In this case, the program must recognize that it is a paragraph of text and not a long label. This case can be recognized by checking the right margin of the lines of text since a label typically does not extend to the far right of the margin. Additionally, the presence or absence of indentation may indicate whether a line of text is a label or not.

In another case, a table may be immediately followed by another table. In this case, the two tables must not be processed as a single table. Since the financial tables usually appear one after another in the filing, and since the filings are in uncoded structure, it is not always completely clear where one table leaves off and the next begins, particularly if both tables have the same number of columns. The system must be flexible enough to handle tables that cross page boundaries, but careful enough to recognize when the table has truly ended, and another table has begun. There are a variety of clues which one can draw upon. Referring to FIG. 1d, in this example, the end of an income statement and the beginning of a balance sheet are illustrated. There is evidence that the end of the income statement has been reached, so the balance sheet will not be read as part of the income statement. At line 2, by accounting convention, a double line under the total implies that a grand total has been reached. Although this is not solid evidence, it can be used as supporting evidence. At line 3, there is a </TABLE> tag which signals the end of a table. These tags, while useful, are not sufficiently reliable because they are inconsistently applied. Line 4 contains a characteristic phrase that generally appears at the end of a table. Such phrases are recognized as marking the end of a table. The tag at line 5 shows a page break, which may or may not imply the end of a table. The <TABLE> declaration at line 6 indicates that a new table has begun. The title on line 9 would also indicate that another table had begun. Lines 14 and 15 contain column headers that are inconsistent (in the number of columns) with the header for the income statement, and would provide proof that the income statement is no longer being processed. Note that a variety of evidence is relied upon to determine if a table has ended, and no one piece of evidence is reliably present.

Referring back to FIG. 2, after the end of a table has been determined, the series of line items may or may not be all part of the table. In order to verify that the line items represent the table in question and to identify components of the table, the mathematical structure of the table is determined by parsing the numbers in the line items as indicated by block 18.

After the table is parsed and the mathematical structure of the table verified, the components making up the table can be identified by pattern matching (block 20).

PARSING THE MATHEMATICAL STRUCTURE OF A TABLE

A financial table is composed of line items, subtotals of the line items, and grand totals. The technique employed by this aspect of the present invention utilizes a bottom-up parser and tests each number to see if it represents a subtotal of the numbers above it. Part of an embodiment of the present invention written in PROLOG is attached herein as Appendixex A, B, C and D and are expressly incorporated herein as part of this disclosure.

FIG. 3 illustrates the general pseudo-code for the bottom up parser. As described, the line items in the table, referred to as a list, are reversed for bottom-up processing. In a pass over the list, a line item is selected from the list and its number is assumed to be a subtotal. If the sum of the numbers of the line items following the selected line item equals the subtotal, the selected line item is determined to be a subtotal and the lines making up the subtotal are marked. This process repeats until each line item has been tested to determined if it is also a subtotal. If any subtotals were found in the process, another pass is made over the list. When no more subtotals are found, the list is reversed to return the line items to their original order.

Figure 4A:
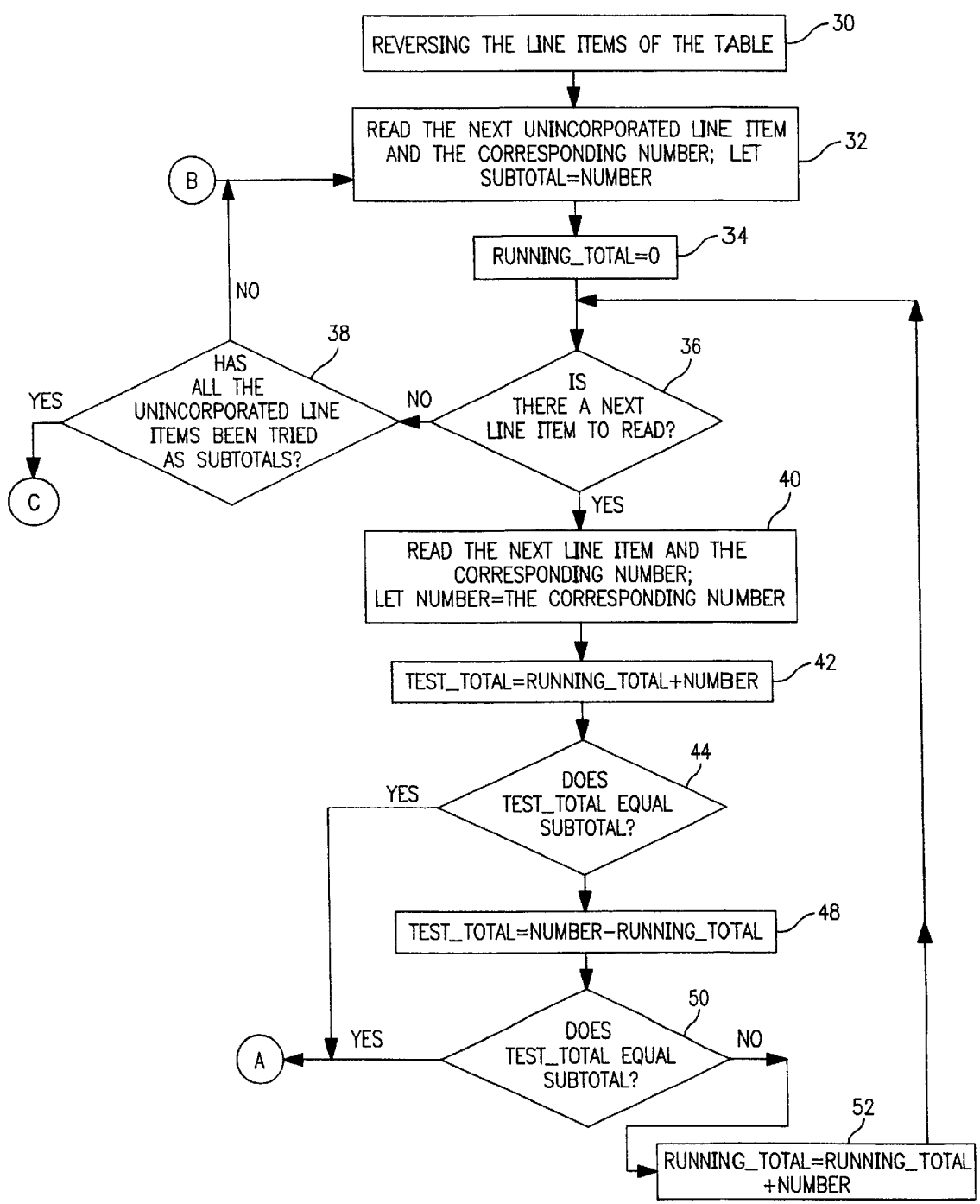
FIGS. 4a–4c is a flowchart illustrating the steps in parsing the line items of a financial table.

Referring to FIG. 4a, a detail flowchart illustrating the steps of the bottom-up parsing method is depicted. As indicated by block 30, the line items of a table are reversed in order to, in effect, process the data from the bottom to the top. The first line of the table is taken as a subtotal 32 and the program attempts to find line items that may sum up to this subtotal by either addition or subtraction. A variable "running_total" is first initialized to 0 34. The next step is to test whether or not there is a next line item to read. If there are no more line items to read 36, the next unincorporated line item in the table is treated as the subtotal and the process repeats until all the line items have been processed 38. If there are still line items in the table to process 36, the next line item is read and a variable, "number", is set to the number of the line item 40.

Figure 4B:
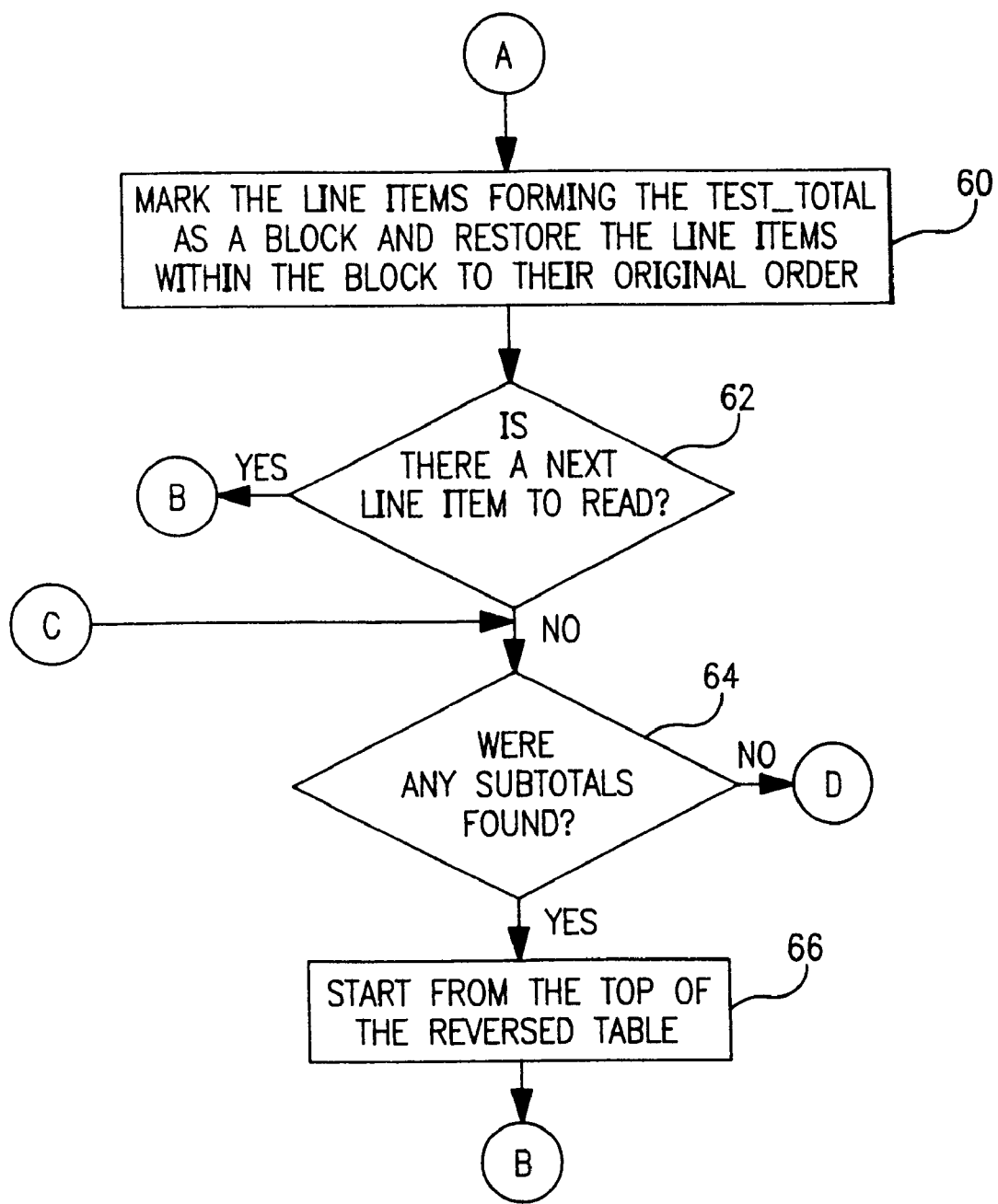

For each line item, a first test determines whether the number of the current line item plus the running total 42 equals the subtotal 44. If this is the case, the program flows to connector A to FIG. 4b. If this is not the case, a second test determines whether the number of the current line item subtracting the running total 48 equals the subtotal 50. If this is not the case, running_total is incremented by number 52 and the next line item is processed in the manner described. If this is case, like the first test, referring to FIG. 4b, connector A, the line items forming the subtotal is marked as a block, the line items within the block are returned to their original order, and the block is treated like a line item in subsequent passes 60. Note that the first line item of a block may be a subtotal and is tested in the subsequent passes. If there is another line item to be read 62, the program logic flows back via connector B to FIG. 4a, where the next line item is set as the subtotal, and an attempt is made to find other subtotal blocks.

Figure 4C:
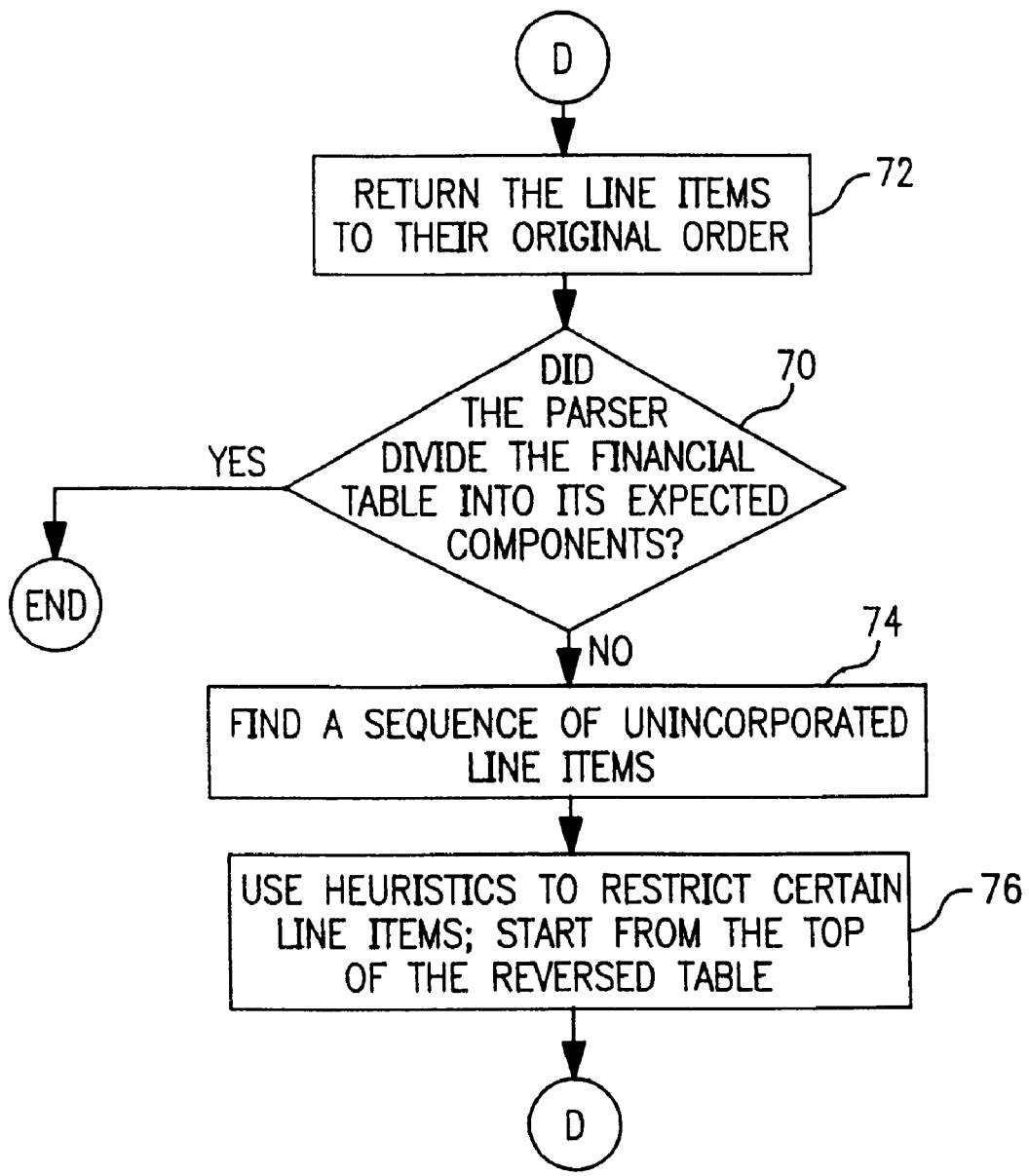

If all the line items are processed and there were one or more subtotals found 64, another pass is made from the top of the table 66 and the process flows to connector B of FIG. 4a. In this manner, larger blocks of subtotals may be found. If no subtotals were found 64, the process flows via connector D to FIG. 4c.

If the parser was able to determine the mathematical structure of the table and the table is thus dividable into its expected components, the line items are reversed to return to their original order 72 and the process ends. If the parser fails to find all the subtotals within the table and thus the components of the table are not recognizable, a second process is used. Since a subtotal may be comprised of a sequence of additions and subtractions, the present invention provides a method that compute "mixed" subtotals by non-deterministically negating a subset of the line items and recomputing the subtotals. First, a sequence of unincorporated line items (line items that are not part of a subtotal) is found. A subset of these line items may be determined as unrestricted line items and combination thereof may be negated. A restricted line item is determined by a heuristics process where the process looks to the label of the line item to find words which suggests that the line item can only be subtracted or added. For example, line items containing words such as "expense" or "cost" imply subtraction. For unrestricted line items, they can be either added or subtracted. In the preferred embodiment, a first combination of the unrestricted line items are negated and a pass is made over the list. If new subtotals are found, the list is re-parsed according to the algorithm described above. If no new subtotals are found, other combinations of the unrestricted line items are tried. If there are N unincorporated lines, it is only necessary to negate at most $(N-1)/2$ lines.

FIG. 5 shows the initial state of a balance sheet after all the line items and their corresponding numbers are identified but before it is processed by the parser. Note that a balance sheet includes an assets section as indicated by lines 3–28, a liabilities section as indicated by lines 31–41 and an equity section as indicated by lines 43–56, and a balance sheet conforms to the formula: assets=liabilities+equities, which is illustrated by lines 28 and 59. FIG. 6 shows the subtotals found, as illustrated by boxes 80, 82, 84, and 86, after the first pass is made by the bottom-up parser. For box 80, lines 5–9 sum up to line 11. The other boxes are summed in similar manner. Note that for box 84, line 33 is determined to be a section header for the subtotal because its position immediately above the line items is used as an indication that it is a section header for the line items. Appendix C illustrates the heuristics used to find the matching header lines. The first definition for subtotal_heading in Appendix C states that a line without numbers immediately preceding the subtotal is considered the label for the subtotal. The second definition allows a non-numbered line to be the header if the header and the footer labels correspond, corresponding conditions include the following: 1) if the header and footer are identical, 2) if the header is "X," and the footer is "Total X" (e.g. "Revenues" and "Total Revenues"), 3) if the header is "X" and the footer is "X TOTAL" (e.g. "Revenues" and "Revenues Total"). Other heuristics may also be used.

Note that subtotals are treated like a line item. Thus, in the next pass, box 86, lines 43–47, and box 84 are grouped as a subtotal, as illustrated by box 90 of FIG. 7. Referring to FIG. 7, line 31 is included in box 90 as a section header using heuristics described above. Referring back to FIG. 6, box 82, the present invention recognizes that the first line item of a subtotal, here line 19, may be a subtotal itself. In the subsequent pass, even though the line 19 is part of a subtotal, because it is the first line of a subtotal, it is treated like a line item and tested as a subtotal. Here, lines 15–17 are found to sum up to line 19 and are incorporated in box 88. In the third pass, referring to FIG. 8, all the line items are incorporated in subtotals as illustrated by boxes 92 and 94. A comparison of the subtotals shows that the two subtotals, lines 27 and 50, are equal in conformance with what is expected for a balance sheet.

At this point, the different levels of subtotals can be used to categorize the line items into their expected categories for a balance sheet and imported into a database or a spreadsheet accordingly. Referring to Appendix D, the code illustrates how the subtotals are used to categorize the table into its components. In lines 1–3, a balance sheet is recognized as being composed of an "assets" section and a "liabilities and equities" section. In lines 7–10, the first subtotal is recognized as the assets section. The number vector representing the assets is extracted and returned in the variable ATotal. In lines 11 through 21, the liabilities and equities section is recognized. On line 15, the next subtotal is recognized as the liabilities and equities section. The call to "same_number_vector" on line 17 validates that the Assets equals to the Liabilities&Equities subtotal.

Finally, a financial table with several columns may have mathematical errors in the columns. If there are three columns and one of the columns contains a mistake, the column containing the error can be identified and the other two columns can be used as reference columns. The type of error can be identified by using the reference columns and the error can be subsequently corrected. Common errors include errors in sign, order of magnitude, difference due to the sign of a line item, or by multiples of 10 (indicating dropping of a digit). Even if there are only two columns, heuristics can be provided to detect which column contains the mistake by analyzing the mathematical structure of the table, and the error can be flagged or corrected.

We claim:

1. A method for parsing a financial table being comprised of a sequence of line items each having a label and/or at least one corresponding number, comprising the steps of,
   1) reversing the sequence of said line items of said financial table;
   2) selecting a line item and designating the number of the selected line item as a subtotal;
   3) summing the numbers from each line item following the selected line item;
   4) if the sum equals said subtotal, marking all summed line items as a block, said block being treated like a line items in subsequent passes;
   5) repeating steps 2)–4) for each following line item until all the line items in the sequence have been tested as a subtotal;
   6) if one or more sums equals the subtotals, starting from the beginning of said reversed sequence and repeating steps 2)–5); and
   7) reversing the sequence of said line items of said financial table.

2. A method as recited in claim 1 wherein said summing step is performed by adding, one number at a time, the numbers of the line items following the selected line item, and comparing the sum to said subtotal.

3. A method as recited in claim 1 wherein said summing step is performed by adding, one number at a time, the numbers of the line items following the selected line item, subtracting the sum from the number of a next line item after the line items following the selected line item, and comparing the result to said subtotal.

4. A method as recited in claim 1 and including after step 6) the following substeps:
   If not all the subtotals are found,
   i) designating unincorporated line items for said table as restricted or unrestricted,
   ii) negating one or more of said unrestricted line items, and
   iii) repeating steps 2)–6).

5. A method for parsing data presented in table format and being comprised of a sequence of line items each having a label and/or at least one corresponding number, comprising the steps of,
   1) reversing the sequence of said line items of said data;
   2) selecting a line item and designating the number of the selected line item as a subtotal;
   3) summing the numbers from each line item following the selected line item;
   4) if the sum equals said subtotal, marking all summed line items as a block, said block being treated like a line items in subsequent passes;
   5) repeating steps 2)–4) for each following line item until all the line items in the sequence have been tested as a subtotal;
   6) if one or more sums equal the subtotals, starting from the beginning of said reversed sequence and repeating steps 2)–5); and
   7) reversing the sequence of said line items of said.

6. A method for verifying a financial table composed of a sequence of line items each having a label and an associated value, wherein the values of said line items forming a mathematical structure for said financial table, comprising the steps of:
   i) reversing the sequence of said line items of said financial table;
   ii) finding subsequences of consecutive line items having sums equal to the value of a line item immediately proceeding each of said respective subseqences of consecutive line items;
   iii) marking said subsequences of consecutive line items as blocks;
   iv) treating each said blocks as line items and repeating steps ii), iii), and iv) until all blocks have been found;
   v) reversing the sequence of said line items of said financial table; and
   vi) verifying said line items and said blocks of said financial table operate to form the mathematical structure of said financial table.

7. A method as recited in claim 6 wherein said verifying step employs mathematical function and uses addition operation.

8. A method as recited in claim 6 wherein said verifying step employs mathematical function and uses subtraction operation.

9. A method as recited in claim 6 wherein said verifying step includes the substeps of:
   i) designating line items not in said blocks either as a restricted line item or an unrestricted line item; and
   ii) subtracting one or more unrestricted line items in forming said mathematical structure.

10. A method for verifying a financial table composed of line items each having a label and an associated value, wherein the values of said line items forming a mathematical structure for said financial table, comprising the steps of:
    i). finding subsequences of consecutive line items having sums equal to the value of a line item immediately following each of said respective subsequences of consecutive line items;
    ii). marking said subsequences of consecutive line items as blocks;
    iii). treating each said blocks as line items and repeating steps i), ii), and iii) until all blocks have been found; and
    iv). verifying said line items and said blocks of said financial table mathematically operate to form the mathematical structure of said financial table.

11. A method as recited in claim 10 wherein said verifying step employs mathematical function and uses addition operation.

12. A method as recited in claim 10 wherein said verifying step employs mathematical function and uses subtraction operation.

13. A method as recited in claim 10 wherein said verifying step includes the substeps of:
    i) designating line items not in said blocks either as a restricted line item or an unrestricted line item; and
    ii) subtracting one or more unrestricted line items in forming said mathematical structure.

14. A method for verifying a table composed of a sequence of line items each having a label and an associated value, wherein the values of said line items forming a mathematical structure for said table, comprising the steps of:
  i). finding subsequences of consecutive line items having sums equal to the value of a line item immediately following each of said respective subsequences of consecutive line items;
  ii). marking said subsequences of consecutive line items as blocks;
  iii). treating each said blocks as line items and repeating steps i), ii), and iii) until all blocks have been found; and
  iv). verifying said line items and said blocks of said financial table mathematically operate to form the mathematical structure of said financial table.

* * * * *